US012598228B2

(12) United States Patent
Snowdon et al.

(10) Patent No.: US 12,598,228 B2
(45) Date of Patent: *Apr. 7, 2026

(54) SYSTEM AND A METHOD FOR DISTRIBUTING INFORMATION

(71) Applicant: Arista Networks, Inc., Santa Clara, CA (US)

(72) Inventors: David Snowdon, Sydney (AU); Alexander Peter Webster, Sydney (AU); Thomas Dejanovic, Sydney (AU)

(73) Assignee: Arista Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/638,161

(22) Filed: Apr. 17, 2024

(65) Prior Publication Data

US 2024/0267434 A1     Aug. 8, 2024

Related U.S. Application Data

(63) Continuation of application No. 17/520,363, filed on Nov. 5, 2021, now Pat. No. 11,985,200, which is a
(Continued)

(30) Foreign Application Priority Data

Sep. 29, 2017     (AU) ................................. 2017903957

(51) Int. Cl.
*H04L 67/10* (2022.01)
*H04L 67/1095* (2022.01)
(Continued)

(52) U.S. Cl.
CPC .......... *H04L 67/10* (2013.01); *H04L 67/1095* (2013.01); *H04L 67/12* (2013.01);
(Continued)

(58) Field of Classification Search
CPC ..... H04L 67/10; H04L 65/40; H04L 67/1095; H04L 67/12; H04L 67/288; H04L 67/56; H04L 67/566
See application file for complete search history.

(56) References Cited

U.S. PATENT DOCUMENTS 9,385,877 B2     7/2016   Kaufman et al.
9,535,931 B2     1/2017   Nelson et al.
(Continued)

FOREIGN PATENT DOCUMENTS

CA          2803846 A1      1/2012
WO        20150195182      12/2015

OTHER PUBLICATIONS

International Search Report issued in corresponding Application No. PCT/AU2018/000188, mailed on Feb. 1, 2019 (3 pages).
(Continued)

*Primary Examiner* — Patrice L Winder
(74) *Attorney, Agent, or Firm* — Tianyi He

(57) ABSTRACT

Embodiments of the invention relate to systems and methods for distributing information. In one or more embodiments of the invention, the method includes receiving, at a replicator, a single data stream originating from a data source, wherein the single data stream comprises a first plurality of data units from the data source; replicating, by the replicator, the single data stream to obtain a first replicated data stream and a second replicated data stream; transmitting the first replicated data stream to a first data recipient; and transmitting the second replicated data stream to a second data recipient.

20 Claims, 7 Drawing Sheets

Related U.S. Application Data continuation of application No. 16/652,007, filed as application No. PCT/AU2018/000188 on Sep. 28, 2018, now Pat. No. 11,196,834.

(51) Int. Cl.

| | |
|---|---|
| *H04L 67/12* | (2022.01) |
| *H04L 67/288* | (2022.01) |
| *H04L 67/56* | (2022.01) |
| *H04L 67/566* | (2022.01) |

(52) U.S. Cl.

CPC ............ *H04L 67/288* (2013.01); *H04L 67/56* (2022.05); *H04L 67/566* (2022.05)

(56) References Cited

U.S. PATENT DOCUMENTS

| | | | |
|---|---|---|---|
| 10,097,366 | B2 | 10/2018 | Galime |
| 10,110,540 | B2 | 10/2018 | Blakers et al. |
| 2002/0120837 | A1 | 8/2002 | Maxemchuk et al. |
| 2010/0046527 | A1* | 2/2010 | Li ............................ H04L 45/60 |
| | | | 370/389 |
| 2012/0324453 | A1 | 12/2012 | Chandramouli et al. |
| 2013/0018987 | A1* | 1/2013 | Seaman .................. H04L 67/63 |
| | | | 709/218 |
| 2013/0021169 | A1 | 1/2013 | Soomro et al. |
| 2014/0016493 | A1 | 1/2014 | Johnsson et al. |
| 2015/0269238 | A1 | 9/2015 | Song et al. |
| 2015/0356678 | A1 | 12/2015 | Schmitt |
| 2016/0308793 | A1* | 10/2016 | Levy-Abegnoli ....... H04L 45/16 |
| 2017/0075959 | A1 | 3/2017 | Branson et al. |
| 2018/0091579 | A1 | 3/2018 | Thomas |
| 2018/0316557 | A1 | 11/2018 | Frangieh et al. |
| 2019/0155935 | A1 | 5/2019 | Walker |

OTHER PUBLICATIONS

Written Opinion issued in corresponding Application No. PCT/AU2018/000188, mailed on Feb. 1, 2019 (6 pages).

Specification of U.S. Appl. No. 62/589,255 for Walker et al., US-20190155935-A1 above, p. 184, Nov. 2017 (Year: 2017).

* cited by examiner

SYSTEM AND A METHOD FOR DISTRIBUTING INFORMATION

This application is a continuation of U.S. patent application Ser. No. 17/520,363, filed Nov. 5, 2021, which is a continuation of U.S. patent application Ser. No. 16/652,007, filed Mar. 27, 2020, which is a national stage application, under 35 U.S.C. § 371, of International patent application No. PCT/AU2018/000188, filed Sep. 28, 2018, which claims priority to Australian patent application No. 2017903957, filed Sep. 29, 2017. The disclosures of these applications are hereby incorporated by reference herein in their entireties.

BACKGROUND

Scenarios often exist in which two or more entities distribute data to and receive data from more than one data recipient. Such data recipients may make decisions based on such received data and/or seek to cause actions by sending such data. A data recipient may gain an advantage based on receipt of data sooner than other data recipients and/or gain an advantage by being able to send data back to the distributing entity faster.

SUMMARY

In general, in one aspect, embodiments of the invention relate to a method for distributing information. In one or more embodiments of the invention, the method includes receiving, at a replicator, a single data stream originating from a data source, wherein the single data stream comprises a first plurality of data units from the data source; replicating, by the replicator, the single data stream to obtain a first replicated data stream and a second replicated data stream; transmitting the first replicated data stream to a first data recipient; and transmitting the second replicated data stream to a second data recipient.

In general, in one aspect, embodiments of the invention relate to a system for distributing information. In one or more embodiments of the invention, the system includes a replicator comprising circuitry. In one or more embodiments of the invention, the replicator includes functionality to receive a single data stream originating from a first data source. The single data stream may include a first plurality of data units. In one or more embodiments of the invention, the replicator also includes functionality to replicate the single data stream to obtain a first replicated data stream and a second replicated data stream, transmit the first replicated data stream to a first data recipient, and transmit the second replicated data stream to a second data recipient.

DETAILED DESCRIPTION

Figure 1:
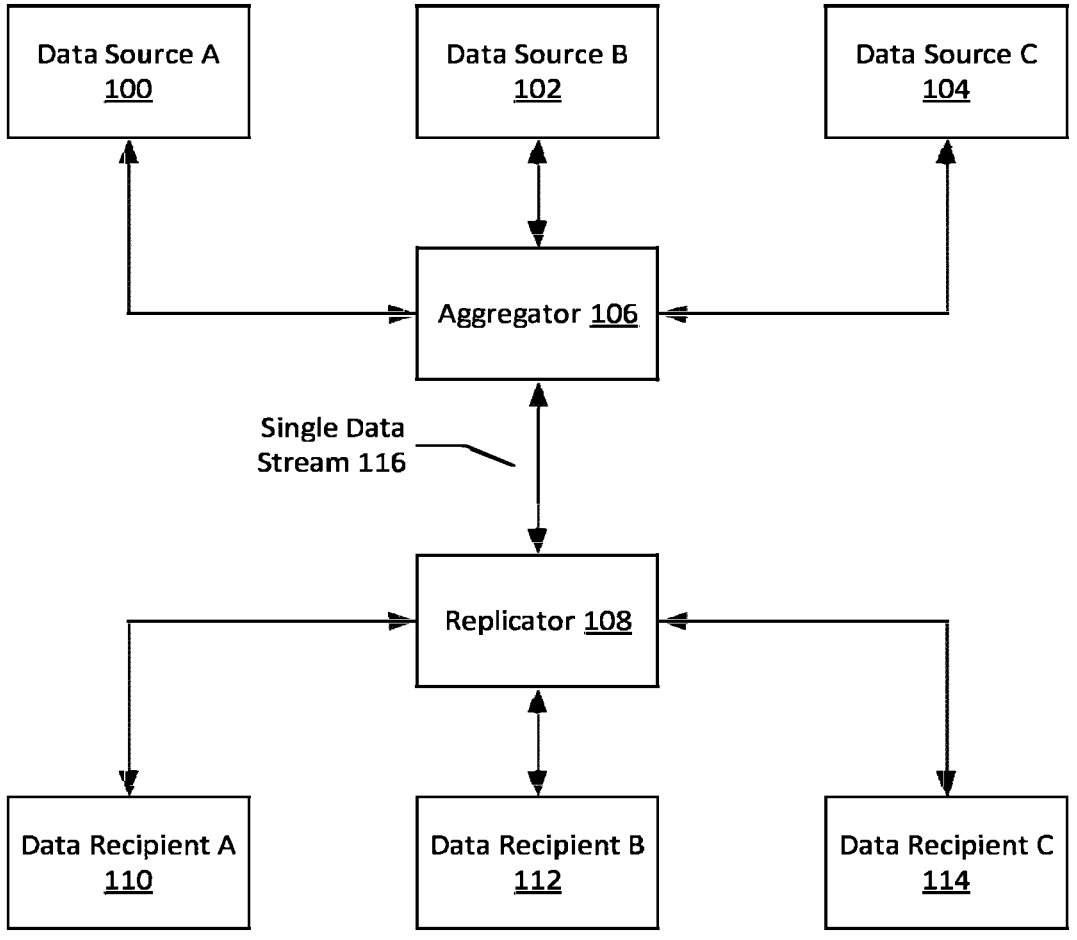
FIG. 1 shows a system in accordance with one or more embodiments of the invention.

Specific embodiments will now be described with reference to the accompanying figures. In the following description, numerous details are set forth as examples of the invention. It will be understood by those skilled in the art, and having the benefit of this Detailed Description, that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure, or that is otherwise described herein, is incorporated by reference and assumed to be optionally present within every other figure and/or embodiment having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure and/or embodiment.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to systems and methods for aggregating data from two or more data sources, and distributing that data to two or more data recipients such that the data arrives at the data recipients at substantially the same time, or arrives subject to a purposely injected random delay. Such systems and methods may create scenarios where data distributed to and/or received from data recipients occurs in a manner that is more fair, as no data recipient may gain an advantage over others by causing situations where a given data recipient is able to receive or transmit data more quickly than other data recipients.

For example, financial instruments (e.g., stocks, bonds, etc.) are often traded using technology housed at the physical location of exchanges on which the financial instruments are traded. One or more computing devices may make up at least a portion of the exchange, and may interface, via a network (e.g., a topology of routers, multi-layer switches, top-of-rack switches, bridges, etc. that provide connectivity between computing devices), with one or more computing devices (e.g., servers in a server rack) controlled by persons or entities that desire to receive information from the exchange and/or conduct trades via interacting with the exchange (i.e., trading entities).

A trading entity may gain an advantage over other trading entities if the computing devices under their control receive market data (e.g., price data, trade data, trade trend data, etc.) from the exchange and/or send orders (e.g., market orders or limit orders to buy or sell) to the exchange faster than the other trading entities, meaning the data received from or transmitted to an exchange may be considered time sensitive. In such a scenario, as to market data, a computing device of a trading entity may be a data recipient, and a computing device of an exchange may be a data source. Conversely, as to orders, a computing device of a trading entity may be a data source, and a computing device of an exchange may be a data recipient.

When such a scenario exists due to the actions of the trading entity gaining the advantage, the scenario may be considered unfair to the trading entities that end up at a disadvantage in speed of data receipt from or transmission of data to the exchange. Examples of such actions include, but are not limited to: using knowledge of network protocols (e.g., a multicast protocol) and the topology of computing devices and network devices of the network to cause certain network devices to perform worse than others (e.g., by causing queues to be consistently more full on certain network devices); modeling the latency characteristics of the network to gain knowledge not available to other traders; etc. Other examples of scenarios where fair delivery of time sensitive information is desired include, but are not limited to, computer gaming competitions, electronic gambling competitions, and real estate auctions.

In one or more embodiments of the invention, unfairness such as that discussed above may be mitigated, at least in part, using a system and method that receives information from a data source, or aggregates information from multiple data sources (e.g., computing devices of an exchange), into a single data stream, and replicates the data for each data recipient (e.g., computing devices controlled by trading entities that are connected to the exchange via a network) that wishes to receive the data. The replicated data may then be transmitted to each such data recipient at substantially the same time, or with a random delay.

Receiving the data at the same time may mitigate, at least in part, the advantage of fast receipt by causing data to arrive at each recipient at the same time. Receiving the data subject to an intentionally injected random delay may mitigate, at least in part, the advantage of fast data receipt by creating an inherent uncertainty and unpredictability of data receipt timing, meaning that a given recipient can't know if the random delay in that recipient's receipt of the data was more or less than any other recipient. In one or more embodiments of the invention, adding random delay to all recipients may introduce true randomness (e.g., via adding uncertainty about how old the information is) while maintaining simultaneous receipt. In one or more embodiments of the invention, adding randomness into the arrival time relative to others breaks simultaneous receipt in a known way.

FIG. 1 shows a system in accordance with one or more embodiments of the invention. As shown in FIG. 1, the system includes one or more data sources (e.g., data source A (100), data source B (102), data source C (104)), an aggregator (106), a single data stream (116), a replicator (108), and one or more data recipients (e.g., data recipient A (110), data recipient B (112), data recipient C (114)). Each of these components is described below.

In one or more embodiments of the invention, both data sources (100, 102, 104) and data recipients are computing devices. In one or more embodiments of the invention, a computing device is any device or any set of devices capable of electronically processing instructions and that includes, at least, one or more processors, memory, input and output device(s), and operative network connectivity to one or more network devices. Examples of computing devices include, but are not limited to, a server (e.g., a blade-server in a blade-server chassis, a rack server in a rack, etc.), a virtual machine (VM), a desktop computer, a mobile device (e.g., laptop computer, smart phone, personal digital assistant, tablet computer and/or any other mobile computing device), a network device (e.g., switch, router, multi-layer switch, etc.) and/or any other type of computing device with the aforementioned requirements.

In one or more embodiments of the invention, a data source (100, 102, 104) includes functionality to obtain data (e.g., market data) desired by one or more data recipients (110, 112, 114), and process the data to obtain data units. In one or more embodiments of the invention, a data unit is any relevant data (e.g., market data) that is transmitted in a format dictated by any one or more network protocols or standards. Examples of such protocols or standards include, but are not limited to, Internet Protocol (IP), Media Access Control (MAC), Transmission Control Protocol (TCP), User Datagram Protocol (UDP), Infiniband, Hypertext Transfer Protocol (HTTP), etc. In one or more embodiments of the invention, the relevant data is at least a portion of the payload of a data unit of any format.

In one or more embodiments of the invention, a data source (100, 102, 104) includes functionality to transmit data units towards data recipients (110, 112, 114). Such transmission of data units may be achieved, at least in part, via a network (not shown). In one or more embodiments of the invention, a network may be an entire network or any portion thereof. A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet. In one or more embodiments of the invention, a network, and any network devices therein, may be arranged in any network topology. In one or more embodiments of the invention, a network topology is an arrangement of various elements of a network.

In one or more embodiments of the invention, a network device may be a physical device that includes, but is not limited to, all or any subset of the following: persistent storage (not shown), memory (e.g., random access memory (RAM)) (not shown), one or more processor(s) (not shown), one or more network chips, one or more circuit components (e.g., wire, resistors, capacitors, transistors, inductors, integrated circuitry packages, printed circuit boards, diodes, comparators, etc.), one or more field programmable gate arrays (FPGAs), one or more application specific integrated circuits (ASICs), one or more complex programmable logic devices (CPLDs) and two or more physical network interfaces (which may also be referred to as ports). A network device may be connected to other devices via wired (e.g., using the ports) and/or wireless connections.

In one or more embodiments of the invention, a network device includes functionality to receive data units at any of the physical network interfaces (i.e., ports) of the network device, and to subsequently transmit the data units from any of the physical network interfaces of the network device.

One example of a network device is a lower layer device. In one or more embodiments of the invention, a lower layer device is a device that includes one or more physical layer switch configured to provide physical connections between ports of the lower layer switch. A physical layer switch may be implemented as a crossbar switch, which has multiple input and output lines arranged in a crossed pattern, with each intersection serving as a switch that may be open to prevent a connection between two ports, or closed to form a connection between two ports of the lower layer device.

Physical layer switches may include functionality to receive data units from a given port of a lower layer device and, based on the configured connections of the physical layer switch, transmit the received data unit to one or more other ports to be transmitted toward whatever is connected to the output port. As used herein, the term lower layer device may refer to devices that also include additional hardware (e.g., FPGA(s)) and/or software to allow for reconfiguration of the connections and other functionality (e.g., aggregation). Such lower layer devices may, for example, function as reconfigurable patch panels. The reconfiguration may occur, for example, via a network administrator using management software to interact, over a network, with any of the hardware and/or software of the lower layer device to reconfigure the connections. Other functionality that may exist in a lower layer device, which may be enabled by additional hardware and/or software, includes, but is not limited to, media conversion, failover, data replication, aggregation, broadcast, monitoring, traffic sampling, multiplexing, filtering, etc.

Other examples of a network device include a higher level network device. Examples of a higher level network device include, but are not limited to, a layer 2 network switch, a router, a multilayer switch, a fibre channel device, an Infini-Band® device, etc. Higher level devices may include functionality to inspect all or certain portions of a data unit in order to determine whether to: (i) drop the data unit; (ii) process the data unit; and/or (iii) transmit the data unit, based on the processing, from a physical network interface or port on the higher level network device.

In one or more embodiments of the invention, a network device includes functionality to store (e.g., in persistent storage, in memory, in a register, etc.), any number of data structures (e.g., filtering information, delay time information, routing information base (RIB), forwarding information base (FIB), link state database, counters, etc.) for facilitating operation of at least some aspects of the network device.

Such structures may be stored in a data repository (not shown) included in and/or operatively connected to the network device. In one or more embodiments of the invention, a data repository is any type of storage unit(s) and/or device(s) (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments of the invention, the network device data repository includes all or any portion of the persistent and/or non-persistent storage of the network device as described above.

In one or more embodiments of the invention, the system includes an aggregator (106). In one or more embodiments of the invention, an aggregator (106) is any hardware (e.g., circuitry), software, firmware, or any combination thereof that includes functionality to receive data units from two or more data sources (100, 102, 104), and to combine the data units into a single data stream (116) (discussed further below). In embodiments of the invention in which data units are being transmitted from only a single data source, the system may not include an aggregator, as aggregation may not be necessary.

An aggregator (106) may be operatively connected to the one or more data sources. As used herein, the phrase 'operatively connected' refers to any direct (e.g., wired directly between two devices) or indirect (e.g., wired and/or wireless connections between any number of devices connecting the operatively connected devices) connection.

Examples of such an operative connection include, but are not limited to: an aggregator (106) being one or more components (e.g., a multiplexer using a first-in first-out (FIFO) buffer, an FPGA, etc.) of a lower layer device that is directly connected to the data sources via a wired connection; an aggregator (106) being one or more components of a lower layer device that is indirectly connected to the data sources via a wired connection to one or more network devices network devices of a network; an aggregator (106) being one or more components of a higher level network device and directly connected to the data sources via wired or wireless connections; an aggregator (106) being one or more components of a higher level network device and indirectly connected to the data sources via other devices in the network using wired and/or wireless connections to the other network devices; etc. In one or more embodiments of the invention, an aggregator (106) is implemented as a separate device that includes an FPGA, which performs the aggregation, and that is operatively connected to the data sources (100, 102, 104) and the replicator (108).

In one or more embodiments of the invention, as discussed above, the aggregator (106) includes functionality to generate a single data stream (116) from data units received from a single data source, or to combine the data units from two or more data sources into a single data stream (116). A single data stream (116) may be any type of signal (e.g., electrical signal, optical signal, etc.) that conveys information. Information may be included in the signal by varying any characteristic of the signal (e.g., phase, amplitude, frequency, wavelength, voltage, current, etc.). An example of an electrical signal is a signal that alternates between a higher and lower level of signal (e.g., two voltage levels), which may be interpreted as a binary signal and that conveys some form of information. As another example, the signal may be an analog signal, in which some signal feature (voltage, current, phase, etc.) may be used convey information. As another example, two or more signals may be paired together, with the information being conveyed to a receiver by a relative difference between one or more signal properties of the signals.

In one or more embodiments of the invention, the single data stream (116) is transmitted using any suitable physical medium, such as, for example, copper, optical wire, fibre cable, any combination thereof, etc. The physical medium for transmitting the single data stream (116) is not limited to the aforementioned examples.

In one or more embodiments of the invention, the single data stream (116) is an ordered data stream that includes the data units from the data sources (100, 102, 104). In one or more embodiments of the invention, the single data stream (116) preserves the order in which the data units were received. In one or more embodiments of the invention, the single data stream (116) also includes any idle time that exists during receipt of data units from the one or more data sources (100, 102, 104).

In one or more embodiments of the invention, medium through which the single data stream (116) is transmitted operatively connects the aggregator (106) and the replicator (108). In one or more embodiments of the invention, the replicator (108) is any hardware (e.g., circuitry), software, firmware, or any combination thereof that is configured to replicate the single data stream (116) into any number of replicated data streams that are to be transmitted to any number of data recipients (110, 112, 114). For example, the replicator (108) may be implemented as a multiplexer, including various circuitry components, that includes functionality to take the single data stream (116) and replicate it for transmission to any number of output ports. As another example, the replicator may be implemented, at least in part, as a crossbar switch, and the replication may be performed by connecting multiple output ports to an input port at which the single data stream is received using the crossbar switch. In one or more embodiments of the invention, the replicated data streams may preserve any one or more of the ordering, the idle time (i.e., gaps), the timing characteristics, the clock, and/or any edge transmissions of the single data stream (116).

In one or more embodiments of the invention, the replicator (108) includes functionality to substantially synchronously replicate the single data stream (116) and transmit the single data stream (116), via any number of ports, to any number of data recipients, such that the data units of the single data stream (116), as reproduced in the replicated data streams, arrive at each data recipient at substantially the same time.

In one or more embodiments of the invention, the replicator (108) is operatively connected to any number of data recipients (110, 112, 114). For example, the replicator (108) may include one or more components and/or software of a lower layer device, and be operatively connected to any number of ports of the lower layer device. In such an example, the ports of the lower layer device to which the replicator (108) is operatively connected may, in turn, be connected to a data recipient (110, 112, 114) each.

In one or more embodiments of the invention, a data recipient (110, 112, 114), as discussed above, is a computing device that is operatively connected to a replicator (108). In one or more embodiments of the invention, a data recipient (110, 112, 114) includes functionality to receive data units via a replicated data stream and, based in the information included therein, take an action. Examples of such actions include, but are not limited to, process all or any portion of the received data units, make a decision based on the received data units, and/or return new data units to one or more data sources. In returning new data units to the data sources, in one or more embodiments of the invention, the roles of the data recipient and the one or more data sources as described herein may be reversed.

In one or more embodiments of the invention, the aggregator (106) and the replicator (108) are each a portion of the components of a single device. For example, the aggregator (106) and the replicator (108) may each be a portion of a lower layer device. In other embodiments of the invention, the aggregator may be implemented as at least a portion of a separate device (e.g., a higher layer network device, a device that includes an FPGA, etc.), while the replicator is implemented as a portion of a different device (e.g., a lower layer device).

In one or more embodiments of the invention, any above-described system component, such as a network device (not shown), a data source (100, 102, 104), an aggregator (106), a replicator (108), and/or a data recipient (110, 112, 114) may also include software and/or firmware stored in any data repository (not shown) and/or memory (not shown) (i.e., non-transitory computer readable mediums). Such software and/or firmware may include instructions which, when executed by one or more processors (not shown) included in and/or operatively connected to the component, cause the one or more processors to perform operations in accordance with one or more embodiments of the invention.

The instructions may be in the form of computer readable program code to perform embodiments of the invention, and may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform functionality related to embodiments of the invention.

While FIG. 1 shows a configuration of components, other configurations may be used without departing from the scope of the invention. For example, there may be any number of data sources (e.g., only one or many more than three) and/or data recipients. As another example, aggregation may occur using a hierarchy of aggregating devices rather than a single aggregator. As another example, if there is only one data source, the system may not include an aggregator. Accordingly, embodiments disclosed herein should not be limited to the configuration of components shown in FIG. 1.

Figure 2:
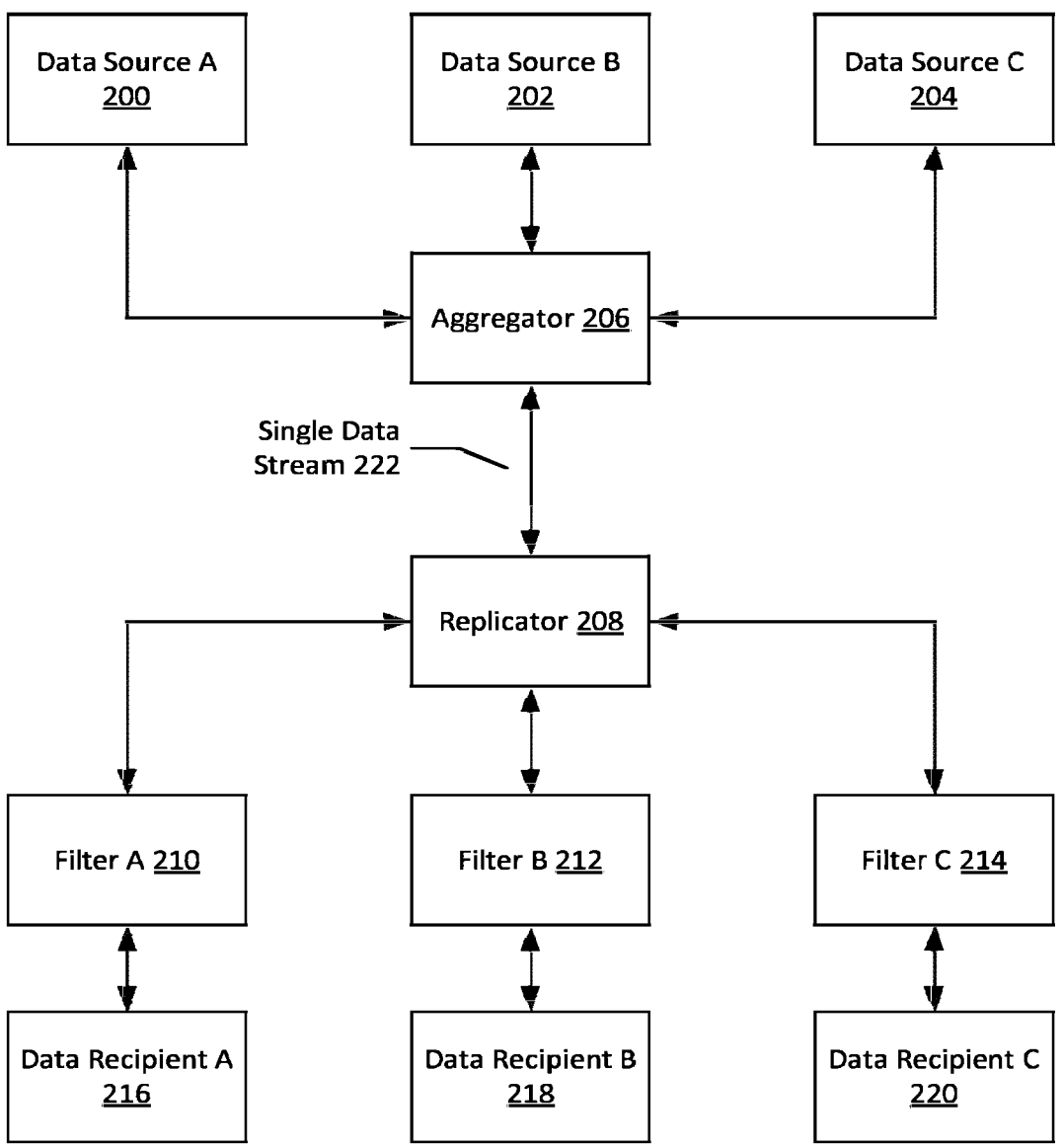
FIG. 2 shows a system in accordance with one or more embodiments of the invention.

FIG. 2 shows a system in accordance with one or more embodiments of the invention. As shown in FIG. 2, the system includes one or more data sources (e.g., data source A (200), data source B (202), data source C (204)), an aggregator (206), a single data stream (222), a replicator (208), one or more data recipients (e.g., data recipient A (216), data recipient B (218), data recipient C (220)), and one or more filters (e.g., filter A (210), filter B (212), filter C (214)). Each of these components is described below.

In one or more embodiments of the invention, each of the data sources (e.g., data source A (200), data source B (202), data source C (204)), the aggregator (206), the single data stream (222), the replicator (208), the data recipients and (e.g., data recipient A (216), data recipient B (218), data recipient C (220)) are substantially similar to the like-named components shown in FIG. 1 and described above.

As shown in FIG. 2, in one or more embodiments of the invention, filters (210, 212, 216) are interposed between the replicator (208) and each of the data recipients (216, 218, 220). In one or more embodiments of the invention, a filter (210, 212, 214) is any hardware (e.g., circuitry), software, firmware, or any combination thereof that is configured to filter out at least a portion of the data units included in a replicated data stream received from the replicator (208).

In one or more embodiments of the invention, the filtering is based on any information included in the data unit. For example, the filtering may be based on a MAC address included in the data unit. In one or more embodiments of the invention, the filtering is performed to prevent transmission of data units to data recipients (216, 218, 218) that do not desire to receive the information included in a filtered data unit. In one or more embodiments of the invention, a filter (210, 212, 214) may be configured in any suitable manner. For example, it may be a configurable hardware filter. As another example, it may be hardware configurable via managing software. Configuration of the filter is not limited to the aforementioned examples.

In one or more embodiments of the invention, a filter (210, 212, 214) is a deterministic filter. In one or more embodiments of the invention, the filters (210, 212, 214) include functionality to substantially preserve the timing characteristics of the replicated data stream which they are filtering. In one or more embodiments of the invention, a filter (210, 212, 214) includes functionality to remove data units from a replicated data stream, but, rather than compress the replicated data stream (i.e., send the next data unit early), the filter (210, 212, 214) includes functionality to add idle time to the replicated data stream that is equal to the size of the removed data unit. Such functionality may prevent early distribution of the information included in any data unit to any data recipient (216, 218, 220). In one or more embodiments of the invention, the interposing of the filters has little or no effect on the system's ability to deliver the replicated data streams to the data recipients at substantially the same time.

In one or more embodiments of the invention, the filters (210, 212, 214) are implemented as part of the same device as the replicator (208). For example, the filters (210, 212, 214) and the replicator (208) may each be a component of a lower layer device (e.g., filters implemented using an FPGA and replication implemented using a physical layer switch).

While FIG. 2 shows a configuration of components, other configurations may be used without departing from the scope of the invention. For example, there may be any number of data sources and/or data recipients. As another example, aggregation may occur using a hierarchy of aggregating devices rather than a single aggregator. As another example, there may be more than one filter between a replicator and a given data recipient. Accordingly, embodiments disclosed herein should not be limited to the configuration of components shown in FIG. 2.

Figure 3:
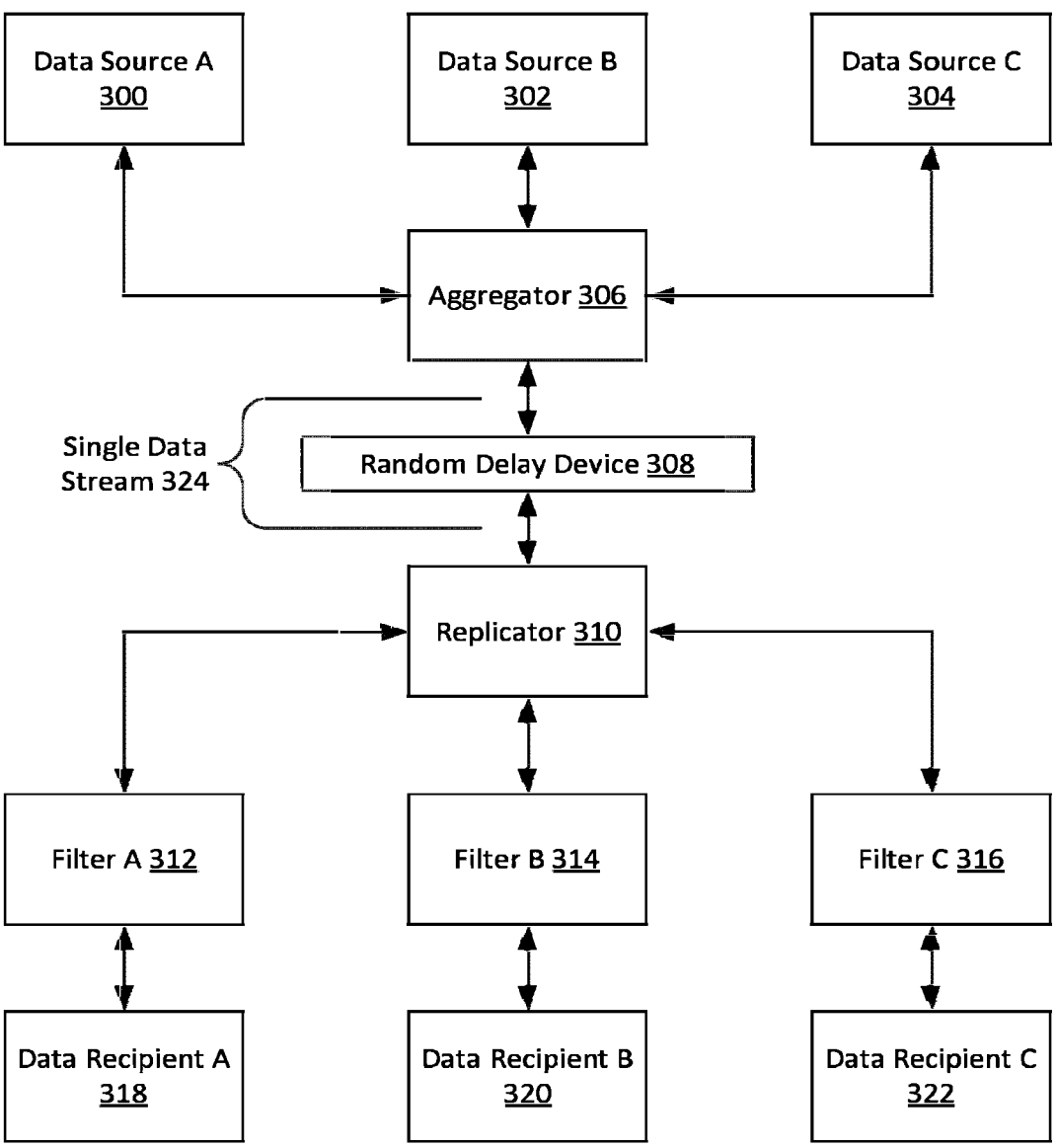
FIG. 3 shows a system in accordance with one or more embodiments of the invention.

FIG. 3 shows a system in accordance with one or more embodiments of the invention. As shown in FIG. 3, the system includes one or more data sources (e.g., data source A (300), data source B (302), data source C (304)), an aggregator (306), a single data stream (324), a replicator (310), one or more data recipients (e.g., data recipient A (318), data recipient B (320), data recipient C (322)), one or more filters (e.g., filter A (312), filter B (314), filter C (316)), and a random delay device (308). Each of these components is described below.

In one or more embodiments of the invention, each of the data sources (e.g., data source A (300), data source B (302), data source C (304)), the aggregator (306), the single data stream (324), the replicator (310), the data recipients (e.g., data recipient A (318), data recipient B (320), data recipient C (322)), and the filters (e.g., filter A (312), filter B (314), filter C (316)) are substantially similar to the like-named components shown in FIG. 1 and/or FIG. 2 and described above.

As shown in FIG. 3, in one or more embodiments of the invention, a random delay device (308) is interposed between the aggregator (306) and the replicator (310). In one or more embodiments of the invention, a random delay device (308) is any hardware (e.g., circuitry), software, firmware, or any combination thereof that is configured to insert a random delay into the single data stream (324). In one or more embodiments of the invention, the random delay is introduced between data units of the single data stream (324), and is, therefore, replicated into the replicated data streams. In one or more embodiments of the invention, the random delay is between zero and a maximum delay threshold. In one or more embodiments of the invention, the maximum delay threshold is configurable. In one or more embodiments of the invention, the random delay device includes a random number generator that is used, at least in part, to generate the variable, random delay to use between the data units of the single data stream (324).

In one or more embodiments of the invention, the random delay device (308) is implemented as part of the same device as the replicator (310). For example, the random delay device (308) and the replicator (310) may each be a portion of a lower layer device. In other embodiments of the invention, the random delay device (308) is implemented as a part of the same device as the aggregator (306). For example, in embodiments of the invention where the aggregator (306) is a higher level network device, the random delay device (308) may be a part of the same higher level network device. In other embodiments of the invention, the aggregator (306), the random delay device (308), and the replicator (310) are all portions of the same device.

While FIG. 3 shows a configuration of components, other configurations may be used without departing from the scope of the invention. For example, there may be any number of data sources and/or data recipients. As another example, aggregation may occur using a hierarchy of aggregating devices rather than a single aggregator. As another example, there may be more than one filter between a replicator and a given data recipient. As another example, the random delay device may be implemented as a set of components or devices on any one or more devices described herein. Accordingly, embodiments disclosed herein should not be limited to the configuration of components shown in FIG. 3.

Figure 4:
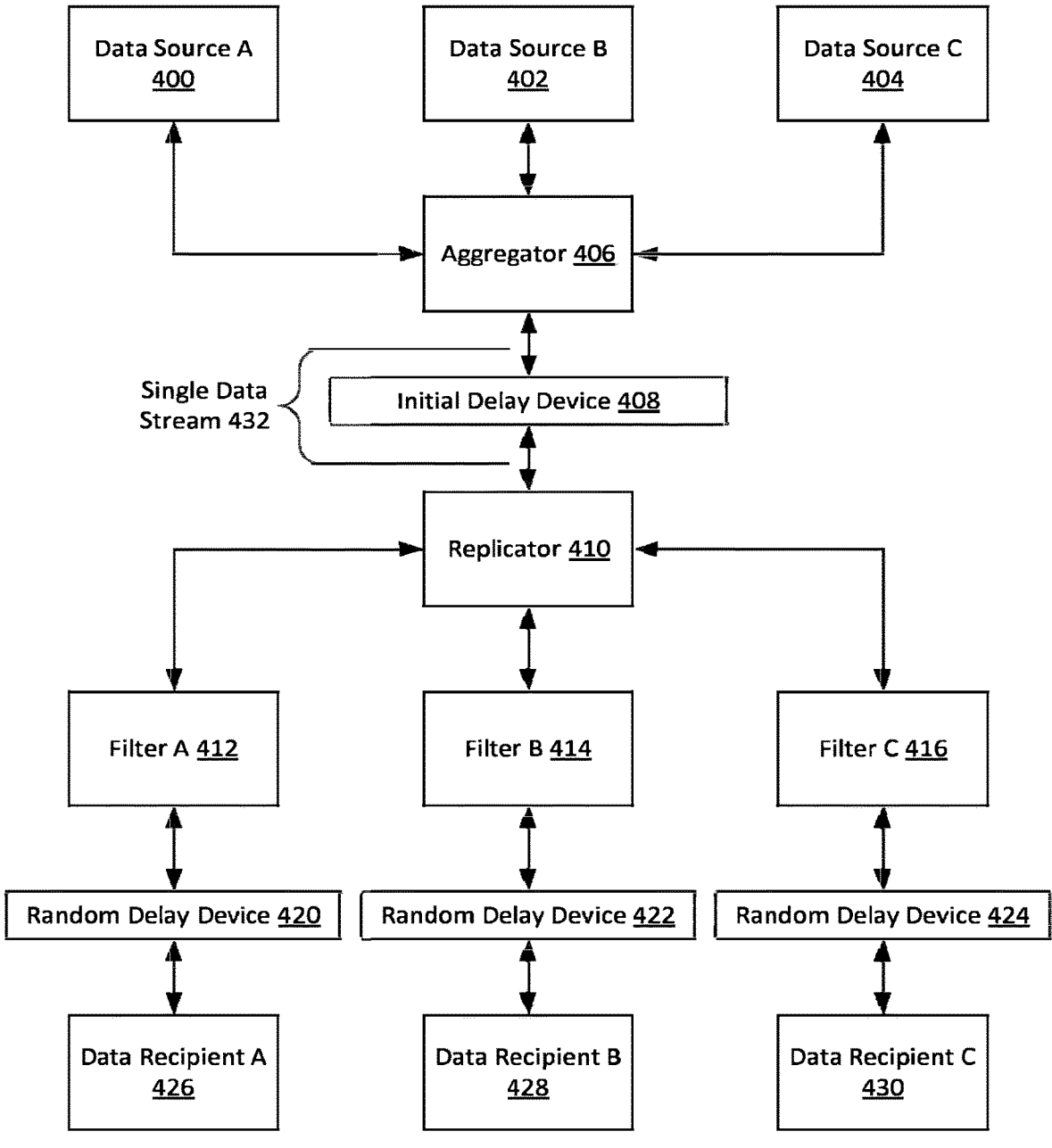
FIG. 4 shows a system in accordance with one or more embodiments of the invention.

FIG. 4 shows a system in accordance with one or more embodiments of the invention. As shown in FIG. 4, the system includes one or more data sources (e.g., data source A (400), data source B (402), data source C (404)), an aggregator (406), a single data stream (324), a replicator (410), one or more data recipients (e.g., data recipient A (426), data recipient B (428), data recipient C (430)), one or more filters (e.g., filter A (412), filter B (414), filter C (416)), an initial delay device (408), and one or more random delay devices (e.g., random delay device A (420), random delay device B (422), random delay device C (424)). Each of these components is described below.

In one or more embodiments of the invention, each of the data sources (e.g., data source A (400), data source B (402), data source C (404)), the aggregator (406), the single data stream (432), the replicator (410), the data recipients (e.g., data recipient A (426), data recipient B (428), data recipient C (430)), and the filters (e.g., filter A (412), filter B (414), filter C (416)) are substantially similar to the like-named components shown in FIG. 1, FIG. 2, and/or FIG. 3 and described above.

As shown in FIG. 4, in one or more embodiments of the invention, an initial delay device (408) is interposed between the aggregator (406) and the replicator (410). In one or more embodiments of the invention, an initial delay device (408) is any hardware (e.g., circuitry), software, firmware, or any combination thereof that is configured to insert a delay into the single data stream (324). The initial delay device (408) may be configured to insert a delay (i.e., a gap or space) between at least a portion of the data units in the single data stream (432).

In one or more embodiments of the invention, the initial delay device includes and/or has access to a desired delay, which may be hardcoded or configurable, and that indicates a desired delay between data units in the single data stream (432). In one or more embodiments of the invention, the desired delay is substantially equivalent to the maximum random delay threshold (discussed below). In one or more embodiments of the invention, the amount of delay that is added by the initial delay device (408) is an amount of delay sufficient to cause the gap between the data units in the single data stream (324) to be substantially the same as the desired delay, which may be considered a deterministically created gap. In such embodiments, the amount of delay added varies from no delay added to a delay equivalent to the desired delay being added.

In one or more embodiments of the invention, the initial delay is introduced between data units of the single data stream (432), and is, therefore, replicated into the replicated data streams.

In one or more embodiments of the invention, the initial delay device (408) is implemented as part of the same device as the replicator (410). For example, the initial delay device (408) and the replicator (410) may each be a portion of a lower layer device. In other embodiments of the invention, the initial delay device (408) is implemented as a part of the same device as the aggregator (406). For example, in embodiments of the invention where the aggregator (406) is a higher level network device, the initial delay device (408) may be a part of the same higher level network device. In other embodiments of the invention, the aggregator (406), the initial delay device (408), and the replicator (410) are all portions of the same device.

As shown in FIG. 4, in one or more embodiments of the invention, a random delay device (420, 422, 424) is interposed between each filter (412, 414, 416) and corresponding data recipient (426, 428, 430). In one or more embodiments of the invention, each of the random delay devices (420, 422, 424) is substantially similar to the random delay device (308) shown in FIG. 3 and described above.

In one or more embodiments of the invention, the desired delay created by the delay added by the initial delay device (408) creates a window (i.e., a gap) that allows for the random delay devices (420, 422, 424) to create random delays for each data recipient that may be different from one another. For example, a data unit from the single data stream, which is replicated into two separate replicated data streams, has a gap behind it in the two replicated data streams that is substantially similar to the desired delay, which is substantially similar to the maximum delay threshold of the two random delay devices in the data path of the two replicated streams. In such an example, each of the random delay devices delays a data unit by a random amount, which may or may not be the same, into their respective replicated data streams, and the delay between zero and the maximum delay threshold. In one or more embodiments of the invention, the ability to have a random delay per data recipient is made possible, at least in part, by the existence of the gap behind the data unit.

While FIG. 4 shows a configuration of components, other configurations may be used without departing from the scope of the invention. For example, there may be any number of data sources and/or data recipients. As another example, aggregation may occur using a hierarchy of aggregating devices rather than a single aggregator. As another example, there may be more than one filter between a replicator and a given data recipient. As another example, the initial delay device may be implemented as a set of components or devices on any one or more devices described herein. As another example, each random delay device may be between the replicator and one of the filters. Accordingly, embodiments disclosed herein should not be limited to the configuration of components shown in FIG. 4.

Figure 5:
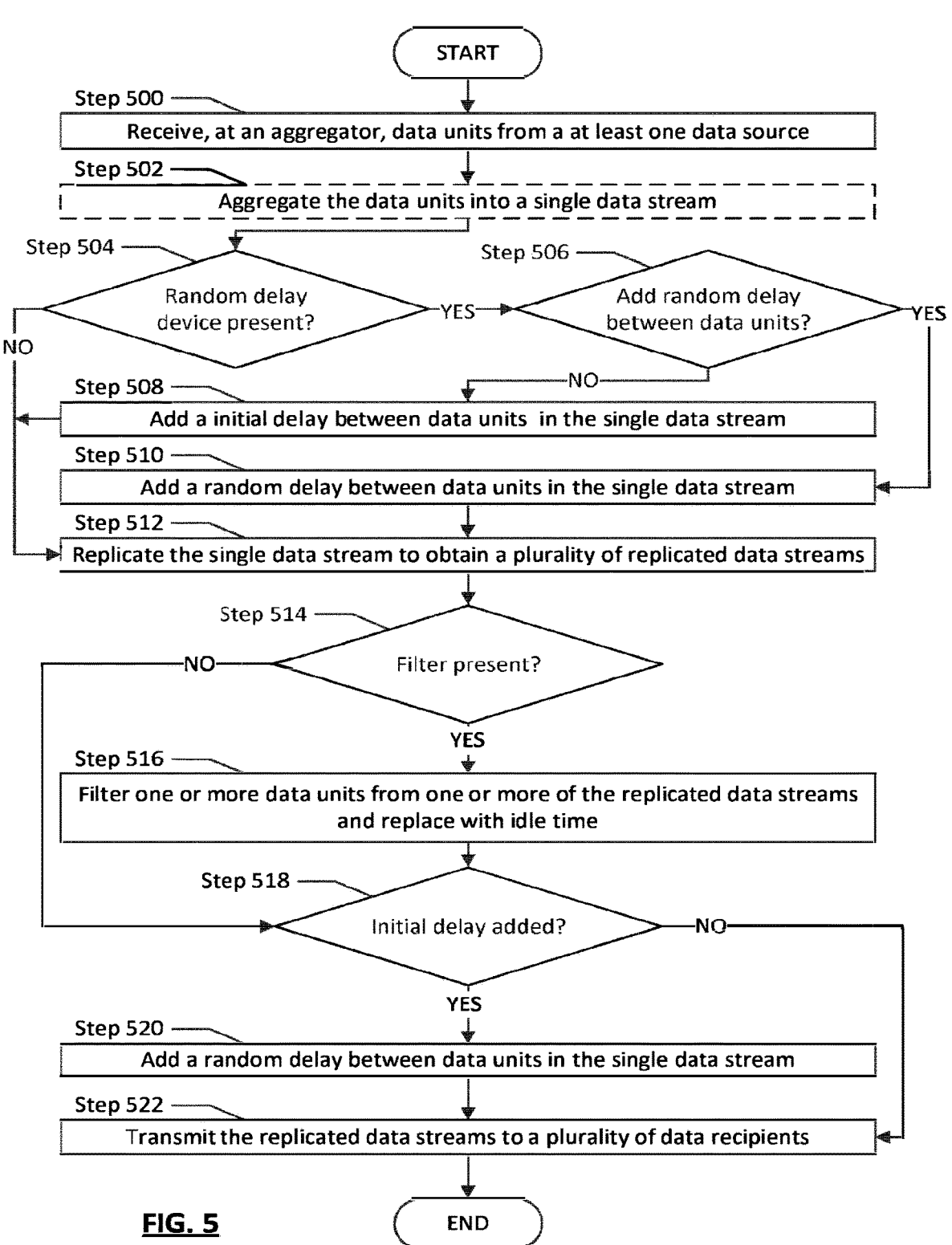
FIG. 5 shows a flowchart in accordance with one or more embodiments of the invention.

FIG. 5 shows a flowchart describing a method for distributing information in accordance with one or more embodiments of the invention. One or more steps shown in FIG. 5 may be omitted or repeated, and any steps may be performed in any different order among different embodiments of the invention.

In Step 500, data units are received at an aggregator from at least one data source. In one or more embodiments of the invention, the data units are received in a certain order and with certain timing characteristics. The received data units may be received over any communication channel between a data source and the aggregator. For example, the data units may be received via as MAC frames encapsulating IP packets that encapsulate information that one or more data recipients are to receive, which are received via a wired connection between a data source computing device and a port of a device (e.g., a lower layer device) in which the aggregator is implemented.

In optional Step 502, the data units received in Step 402 are aggregated into a single data stream. In one or more embodiments of the invention, if the data units are received from only a single data source, then Step 502 may be omitted, as in may not be necessary to aggregate. In such a scenario, the single data stream may be substantially similar to the stream of data units as received from the single data source. In embodiments of the invention where data units are received from more than one data source, then Step 502 is necessary, and the aggregator aggregates the data units from the multiple data sources to generate the single data stream. In one or more embodiments of the invention, the aggregator, when generating the single data stream, preserves the order and timing of the received data units. In one or more embodiments of the invention, the aggregator also maintains and idle time (e.g., gaps), which may result from periods of time where no data units are received from one or more data sources.

In Step 504, the decision is made by way of the components that are present in the system. If the system is a system that includes any one or more random delay devices to insert gaps into either the single data stream or the replicated data streams, the method proceeds to Step 506. If on the other hand, the system includes no such random delay devices, the method proceeds to Step 512.

In Step 506, the decision is made by way of the components that are present in the system. If the system includes an initial delay device between the aggregator and the replicator on the single data stream, the method proceeds to Step 508. If on the other hand, the system includes a random delay device between the aggregator and the replicator on the single data stream, the method proceeds to Step 510.

In Step 508, because the system includes an initial delay device, an initial delay is added to the single data steam. In one or more embodiments of the invention, the initial delay device adds an amount of delay sufficient to have the delay between data units in the single data stream be substantially equivalent to a desired delay, which may be substantially similar to a maximum delay threshold of the random delay devices that exist between the filters and the data recipients in a system that includes an initial delay device. Accordingly, in one or more embodiments of the invention, the initial delay device adds any amount of delay between zero and the maximum delay threshold. In one or more embodiments of the invention, the adding of initial delay ensures that a deterministically sized gap exists between data units in the single data stream. A delay may be added in any matter that increases the timing between data units in the data stream. For example, the signal carrying the single data stream may be forced to a steady value for a period of time. As another example, the signal may be altered to represent a series of binary digits for a period of time before being used to transmit the next data unit. After the initial delay is added to the single data stream, the method proceeds to Step 512.

In Step 510, because the system includes a random delay device between the aggregator and the replicator, a random delay is added to the single data steam. In one or more embodiments of the invention, the random delay is between zero and a maximum delay threshold. In one or more embodiments of the invention, adding a random delay creates randomly sized gaps between data units in the single data stream.

In Step 512, the single data stream is replicated by a replicator into any number or replicated data streams. The single data stream may be replicated in any suitable manner of data stream replication. For example, the replicator may regenerate the signal one time for each of the data recipients to which the replicator is operatively connected. As another example, the replicator may be implemented as a demulti-plexer that switches the input line of the single data stream between outputs connected to ports that are connected to the data recipients. In one or more embodiments of the invention, the replicated data streams are each a copy of the single data stream, and, as such, preserve the order, timing, gaps, etc. of the single data stream.

In Step 514, the decision is made by way of the components that are present in the system. If the system includes filters between the replicator and the data recipients on the replicated data streams, the method proceeds to Step 516. If on the other hand, the system does not include filters between the replicator and the data recipients on the replicated data streams, the method proceeds to Step 518.

In step 516, one or more data units are filtered by the filters from the replicated data streams, and replaced with idle time. In one or more embodiments of the invention, the filters may be configured to filter out data units that a given data recipient does not want to receive or is not subscribed to receive. For example, a data recipient receiving data from a financial exchange may only wish to receive certain items of market data, such as market information for only a subset of the companies listed on the exchange.

The filtering may occur using any filtering method capable of removing data units from a data stream. For example, the filter may be hardware that is configured by software to examine the data units and, if they match some criteria (e.g., having a certain source IP address, a certain string of characters in the payload, etc.), to filter the packet from the stream. In one or more embodiments of the invention, the filtered packet is replaced with idle time, thereby creating a gap in the replicated data stream. In one or more embodiments of the invention, the gap is added in order to preserve the timing of the stream in regards to the unfiltered packets. In one or more embodiments of the invention, preserving the timing mitigates the chance that a data unit in the replicated data stream after a filtered data unit is not delivered to a data recipient earlier than the data unit is delivered, via other replicated data streams in which the filtered data unit was not filtered.

In Step 518, the decision is made by way of the whether or not an initial delay was added in Step 508. If an initial delay was added, the method proceeds to Step 520. If an initial delay was not added, the method proceeds to Step 522.

In Step 520, a random delay is added to the replicated data streams generated in Step 512. In one or more embodiments of the invention, the adding of random delay is substantially similar to that described with respect to the single data stream in Step 510, above. In one or more embodiments of the invention, the amount of random delay added to the replicated data stream is less than the gap between one data unit and the next that was created by the initial delay added in Step 508.

In Step 522, the data units in the replicated data streams are transmitted to the operatively connected data recipients. In one or more embodiments of the invention, the replicated data streams are transmitted from ports operatively connected to the replicator and to the data recipients. In one or more embodiments of the invention, the communications channels between the replicator and the data recipients are configured to allow for the data units of the replicated data streams to be, unless filtered, received by data recipients at substantially the same time, unless some random delay has been added to the streams.

Figure 6:
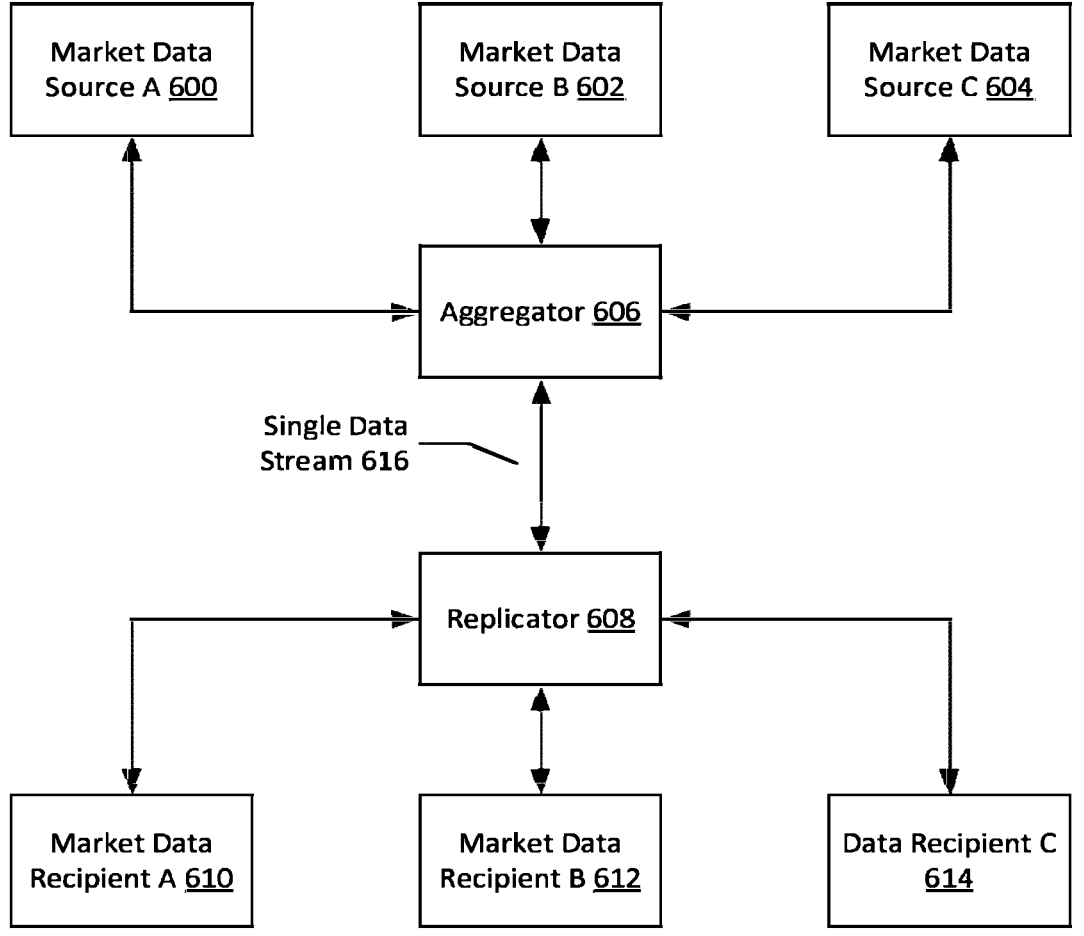
FIG. 6 shows an example in accordance with one or more embodiments of the invention.

FIG. 6 shows an example in accordance with one or more embodiments of the invention. The following example is for explanatory purposes only and not intended to limit the scope of the invention.

Referring to FIG. 6, consider a scenario in which a financial exchange has three servers, which function as market data sources (market data source A (600), market data source B (602), market data source C (604)). The market data sources (600, 602, 604) are directly connected to network devices (not shown) in a network topology (not shown). Elsewhere in the topology, a lower layer device is connected that includes an aggregator (606). The lower layer device also includes a replicator (608), to which the aggregator is connected by an internal fabric of the lower layer device. The replicator (608) is connected to a portion of the ports of the lower layer device, and market data recipients (market data recipient A (610), market data recipient B (612), market data recipient A (614)) are connected to those ports.

In such a scenario, the market data sources (600, 602, 604) each include a market data for a third of the businesses listed on the exchange. Each of the market data recipients (610, 612, 614) wishes to receive market data from all three sources. In order to help ensure fairness, the market data must be delivered to the market data recipients (610, 612, 614) at substantially the same time, so that no one or more market data recipients (610, 612, 614) receives an unfair advantage derived from receipt of the market data, or any portion thereof, earlier than other recipients.

To achieve the goal of helping to ensure substantially simultaneous delivery, all of the market data is transmitted from the market data sources (600, 602, 604) to the aggregator (606) via the network topology and ports of the lower layer device to which the aggregator is connected. The aggregator aggregates the market data from the three market data sources (600, 602, 604), preserving order, timing, and gaps, into a single data stream (616). The single data stream (616) is then transmitted from the aggregator (606) to the replicator (608) over a communication channel within the lower layer device.

The replicator (608) then regenerates the single data stream (616) three times to obtain three replicated data streams. Lastly, each of the replicated data streams is transmitted to the respective market data recipients (610, 612, 614) from ports of the lower layer device over a transmission medium configured to ensure that each data unit in the replicated data streams reaches each market data recipient at substantially the same time.

Figure 7:
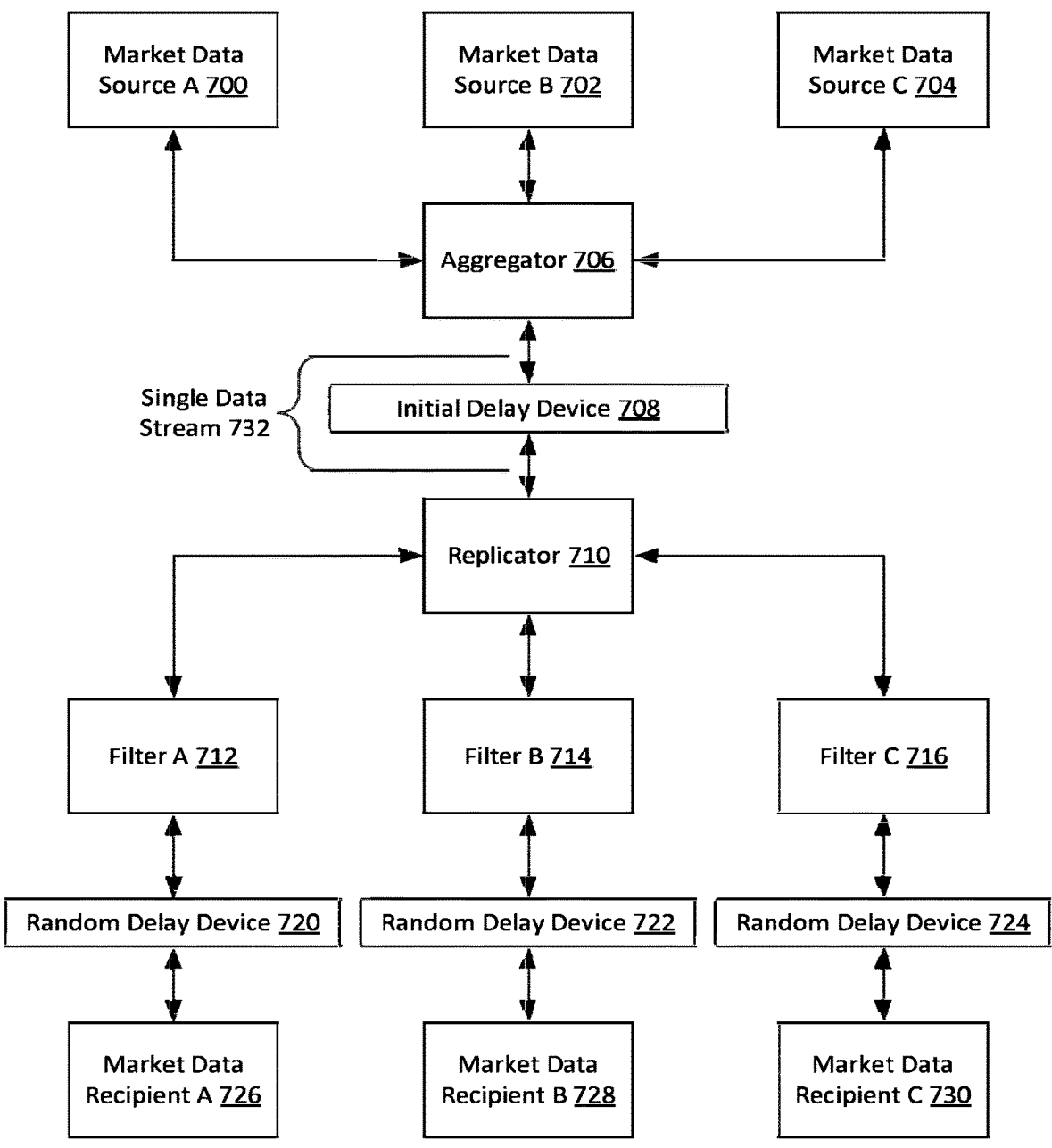
FIG. 7 shows an example in accordance with one or more embodiments of the invention.

FIG. 7 shows an example in accordance with one or more embodiments of the invention. The following example is for explanatory purposes only and not intended to limit the scope of the invention.

Referring to FIG. 7, consider a scenario again in which a financial exchange has three servers, which function as market data sources (market data source A (700), market data source B (702), market data source C (704)). The market data sources (700, 702, 704) are directly connected to network devices (not shown) in a network topology (not shown). Elsewhere in the topology, a higher layer switch is connected that includes an aggregator (706). The higher layer switch that includes the aggregator (706) is operatively connected to a port of a lower layer device that includes a replicator (710), to which the aggregator is connected by an internal fabric of the lower layer device. An initial delay device (708) exists in the communication channel between the aggregator (706) and the replicator (710). The replicator (710) is connected to filters (filter A (712), filter B (714), filter C (716). The filters (712, 714, 716) are respectively connected to random delay devices (random delay device A (720), random delay device B (722), random delay device C (724)). The random delay devices (720, 722, 724) are connected to three of the ports of the lower layer device, and market data recipients (market data recipient A (726), market data recipient B (728), market data recipient A (730)) are connected to those ports.

The market data sources (700, 702, 704) each include a market data for a third of the businesses listed on the exchange. Each of the market data recipients (726, 728, 730) wishes to receive market data from only two of the three sources. In order to help ensure fairness, the market data is be delivered to the market data recipients (726, 728, 730) subject to a random delay that differs per data unit to each market data recipient (726, 728, 730). Market recipient A (726) is only interested in receiving market data from market data source A (700) and market data source B (702). Market recipient B (728) is only interested in receiving market data from market data source A (700) and market data source C (704). Market recipient C (730) is only interested in receiving market data from market data source B (70s) and market data source C (704).

To achieve the goal of transmitting the correct portion of the market data to the market data recipients with random delays, all of the market data is transmitted from the market data sources (700, 702, 704) to the aggregator (706) via the network topology and ports of the higher layer switch to which the aggregator is connected. The aggregator aggregates the market data from the three market data sources (700, 702, 704), preserving order, timing, and gaps, into a single data stream (732). The single data stream (732) is then transmitted from the aggregator (706) to the replicator (710) over a communication channel within the lower layer device.

Because the communication channel includes an initial delay device, a gap is inserted between data units in the single data stream (732) by adding an initial delay between the data units. The amount of the added initial delay may vary, with a goal of having the gap be substantially similar to the maximum delay threshold of the random delay devices. After the initial delay is added, the single data stream (732) continues to the replicator by being transmitted from a port on the higher layer device of the aggregator (706) to a port on the lower layer device operatively connected to the replicator (710). The lower level device also includes the filters (712, 714, 716) and the random delay devices (720, 722, 724). The replicator (710) then regenerates the single data stream (732) three times to obtain three replicated data streams.

The replicated data stream intended for market data recipient A (726) is sent to filter A (712). Filter A (712) filters out data units from market data source C (704) based on the source IP address in the data units. The replicated data stream intended for market data recipient B (728) is sent to filter B (714). Filter B (714) filters out data units from market data source B (702) based on the source IP address in the data units. The replicated data stream intended for market data recipient C (728) is sent to filter C (716). Filter C (716) filters out data units from market data source A (700) based on the source IP address in the data units. All filtered data units are replaced with idle time to preserve the timing of the data units.

After the filtering, the replicated data streams are transmitted to their respective random delay devices (720, 722, 724). Each of the random delay devices (720, 722, 724) add a different amount of delay to their respective data streams that is less than the maximum delay threshold and changes per data unit.

Lastly, each of the filtered replicated data streams with different random delays is transmitted to the respective market data recipients (726, 728, 730) from ports of the lower layer device over a transmission medium.

Embodiments of the invention described above allow for increased fairness in delivery of time sensitive information (e.g., market information, gaming information, real estate information, gambling information) to recipients that may use the information in some way. The increase in fairness is achieved either by ensuring the information is delivered to the recipients at substantially the same time, or by making the delivery less predictable by intentionally adding a random delay in the delivery streams of the information.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A network device comprising:
physical network interfaces;
a replicator comprising circuitry, operatively connected to the physical network interfaces, and configured to
receive a single data stream comprising a plurality of data units that includes a set of data units received from a data source via one of the physical network interfaces, and
replicate the single data stream to obtain a first replicated data stream having the plurality of data units and a second replicated data stream having the plurality of data units;
a first delay device comprising circuitry and configured to add at least a first delay between two of the plurality of data units in the first replicated data stream, wherein one of the physical network interfaces is configured to transmit the first replicated data stream with the added first delay to a first data recipient; and
a second delay device comprising circuitry and configured to add at least a second delay between two of the plurality of data units in the second replicated data stream, wherein one of the physical network interfaces is configured to transmit the second replicated data stream with the added second delay to a second data recipient.

2. The network device defined in claim 1, wherein the first delay device is a first random delay device.

3. The network device defined in claim 2, wherein the second delay device is a second random delay device.

4. The network device defined in claim 3, wherein the plurality of data units in the first replicated data stream comprises a given data unit, wherein the plurality of data units in the second replicated data stream comprises the given data unit, wherein the first delay device transmits, using one of the physical network interfaces, the given data unit with the first delay in the first replicated data stream for reception by the first data recipient and at a first time, and wherein the second delay device transmits, using one of the physical network interfaces, the given data unit with the second delay in the second replicated data stream for reception by the second data recipient and at a second time different than the first time.

5. The network device defined in claim 4, wherein the difference between the first and second times is based on a difference between the first and second delays.

6. The network device defined in claim 1, wherein the plurality of data units in the received single data stream has a gap between two data units, wherein the plurality of data units in the first replicated data stream has the gap between the two data units, and wherein the plurality of data units in the second replicated data stream has the gap between the two data units.

7. The network device defined in claim 6, wherein the first delay device is configured to add the first delay by introducing the first delay between the two data units in the first replicated data stream and wherein the second delay device is configured to add the second delay by introducing the second delay between the two data units in the second replicated data stream.

8. The network device defined in claim 6 further comprising:

a third delay device comprising circuitry and configured to introduce the gap between the two data units in the received single data stream prior to the received single data stream being replicated.

9. The network device defined in claim 1, wherein the replicator, the first delay device, and the second delay device are portions of one or more physical layer switches.

10. The network device defined in claim 1, wherein the first delay device transmits, using one of the physical network interfaces, the first replicated data stream with the added first delay between two of the plurality of data units for reception by the first data recipient via a first communication channel and wherein the second delay device transmits, using one of the physical network interfaces, the second replicated data stream with the added second delay between two of the plurality of data units for reception by the second data recipient via a second communication channel.

11. A method for distributing information using a network device that includes physical network interfaces, the method comprising:

receiving, by a replicator of the network device operatively connected to the physical network interfaces, a single data stream comprising a plurality of data units that includes a set of data units received from a data source via one of the physical network interfaces;

replicating, by the replicator, the single data stream to obtain a first replicated data stream comprising the plurality of data units and a second replicated data stream comprising the plurality of data units;

adding, by a first delay device of the network device, at least a first delay between two of the plurality of data units in the first replicated data stream;

adding, by a second delay device of the network device, at least a second delay different than the first delay between two of the plurality of data units in the second replicated data stream;

transmitting, via one of the physical network interfaces, the first replicated data stream with the added first delay to a first data recipient using a first communication channel; and transmitting, via one of the physical network interfaces, the second replicated data stream with the added second delay to a second data recipient using a second communication channel.

12. The method defined in claim 11, wherein the plurality of data units in the received single data stream are each delayed by an initial delay.

13. The method defined in claim 12, wherein replicating the single data stream to obtain the first replicated data stream comprises obtaining the first replicated data stream containing the initial delay delaying each of the plurality of data units and wherein replicating the single data stream to obtain the second replicated data stream comprises obtaining the second replicated data stream containing the initial delay delaying each of the plurality of data units.

14. The method defined in claim 13, wherein the first delay is added between two of the plurality of data units in the first replicated data stream delayed by the initial delay and wherein the second delay is added between two of the plurality of data units in the second replicated data stream delayed by the initial delay.

15. The method defined in claim 11, wherein the first delay and the second delay each comprise a random delay.

16. The method defined in claim 15, wherein the first and second delays cause the reception of a same data unit in the first and second replicated data streams by the first and second data recipients, respectively, at different times.

17. The method defined in claim 16, wherein replicating the single data stream to obtain the first and second replicated data streams comprises obtaining the same data unit in the first and second replicated data streams with a same initial delay.

18. The method defined in claim 11, wherein the replicator, the first delay device, and the second delay device are portions of one or more physical layer switches.

19. A network device comprising:

physical network interfaces;

a replicator comprising circuitry, operatively connected to the physical network interfaces, and configured to receive a single data stream comprising a plurality of data units that includes a set of data units received from a data source via one of the physical network interfaces, and replicate the single data stream to obtain a first replicated data stream having the plurality of data units and a second replicated data stream having the plurality of data units;

a delay device comprising circuitry and configured to add at least a delay between two of the plurality of data units in the first replicated data stream; and a filter comprising circuitry and configured to filter out a set of data units from the plurality of data units in the first replicated data stream and replace the filtered out set of data units with idle time, wherein one of the physical network interfaces is configured to transmit the first replicated data stream with the added delay and with the idle time to a data recipient.

20. The network device defined in claim 19, wherein the replicator, the delay device, and the filter are portions of one or more physical layer switches.

\* \* \* \* \*